(12) United States Patent
Frink et al.

(10) Patent No.: US 11,558,775 B2
(45) Date of Patent: Jan. 17, 2023

(54) DETERMINING RATE DIFFERENTIAL WEIGHTED FAIR OUTPUT QUEUE SCHEDULING FOR A NETWORK DEVICE

(71) Applicant: Juniper Networks, Inc., Sunnyvale, CA (US)

(72) Inventors: Craig R. Frink, Chelmsford, MA (US); Anurag P. Gupta, Saratoga, CA (US); Harshad B. Agashe, Bangalore (IN); Weidong Xu, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/176,754

(22) Filed: Feb. 16, 2021

(65) Prior Publication Data
US 2022/0264364 A1 Aug. 18, 2022

(51) Int. Cl.
*H04W 28/02* (2009.01)
*H04L 12/867* (2013.01)
(Continued)

(52) U.S. Cl.
CPC ........ *H04W 28/0289* (2013.01); *H04L 47/52* (2013.01); *H04L 47/629* (2013.01); *H04W 28/0273* (2013.01); *H04W 28/0284* (2013.01)

(58) Field of Classification Search
CPC ........ H04W 28/0289; H04W 28/0273; H04W 28/0284; H04L 47/52; H04L 47/629
See application file for complete search history.

(56) References Cited

U.S. PATENT DOCUMENTS 6,651,128 B1 * 11/2003 Gulick ............... G06F 13/362
710/36
8,473,881 B1 * 6/2013 Fang ................. G06F 30/392
716/124
(Continued)

FOREIGN PATENT DOCUMENTS

EP 1471700 A2 10/2004
EP 2575329 A1 4/2013
WO 9714240 A1 4/1997

OTHER PUBLICATIONS

Extended European Search Report for Application No. EP21167717.4, dated Oct. 13, 2021, 12 pages.
(Continued)

*Primary Examiner* — Rasheed Gidado
(74) *Attorney, Agent, or Firm* — Harrity & Harrity, LLP

(57) ABSTRACT

A network device may receive packets and may calculate, during a time interval, an arrival rate and a departure rate, of the packets, at one of multiple virtual output queues. The network device may calculate a current oversubscription factor based on the arrival rate and the departure rate, and may calculate a target oversubscription factor based on an average of previous oversubscription factors associated with the multiple virtual output queues. The network device may determine whether a difference exists between the target oversubscription factor and the current oversubscription factor and may calculate, when the difference exists, a scale factor based on the current oversubscription factor and the target oversubscription factor. The network device may calculate new scheduling weights based on prior scheduling weights and the scale factor, and may process packets received by the multiple virtual output queues based on the new scheduling weights.

20 Claims, 9 Drawing Sheets

(51) Int. Cl.
*H04L 12/873* (2013.01)
*H04L 47/52* (2022.01)
*H04L 47/629* (2022.01)

(56) References Cited

U.S. PATENT DOCUMENTS

| | | | | |
|---|---|---|---|---|
| 10,608,948 | B1* | 3/2020 | Leib | H04L 47/26 |
| 10,721,187 | B1* | 7/2020 | Goldman | H04L 49/3027 |
| 2002/0048280 | A1* | 4/2002 | Lee | H04L 47/10 |
| | | | | 370/468 |
| 2002/0075884 | A1* | 6/2002 | Wellen | H04Q 11/0066 |
| | | | | 370/414 |
| 2004/0213156 | A1* | 10/2004 | Smallwood | H04L 47/2458 |
| | | | | 370/395.42 |
| 2010/0103815 | A1* | 4/2010 | Kotrla | H04L 47/10 |
| | | | | 370/229 |
| 2011/0149967 | A1* | 6/2011 | Chen | H04L 12/40013 |
| | | | | 370/392 |
| 2013/0070592 | A1* | 3/2013 | Chen | H04L 47/22 |
| | | | | 370/230.1 |
| 2013/0329577 | A1* | 12/2013 | Suzuki | H04L 49/1515 |
| | | | | 370/252 |
| 2020/0204495 | A1* | 6/2020 | Mallick | G06F 3/061 |

OTHER PUBLICATIONS

Juniper Networks Techlibrary, "Understanding CoS Port Schedulers on QFX Switches," Traffic Management User Guide (QFX Series and EX4600 Switches), Mar. 17, 2021, pp. 1-17, XP055846250, Retrieved from Internet URL: [https://www.juniper.neudocumentation/us/en/software/junos/traffic-mgmt-qfx/topics/concepUcos-qfx-series-schedulers-port-understanding-10k.html], [Retrieved on Sep. 30, 2021].

Li et al., "Proportional Delay 1-15 Differentiation Service Based on Weighted Fair Queuing," Computer Communications and Networks, Proceedings 9th International Conference, Oct. 16, 2000, pp. 418-423, XP010524540.

* cited by examiner

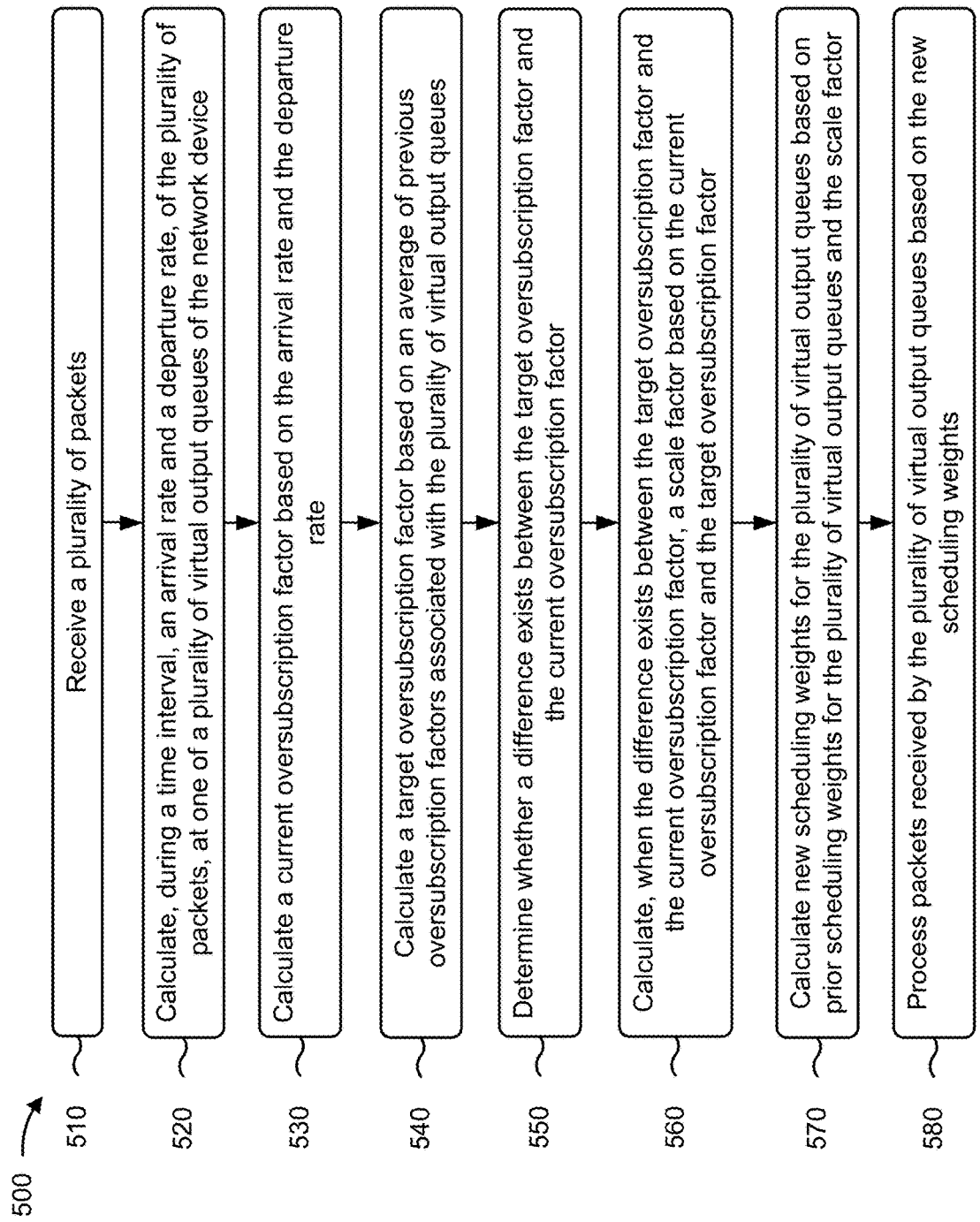

DETERMINING RATE DIFFERENTIAL WEIGHTED FAIR OUTPUT QUEUE SCHEDULING FOR A NETWORK DEVICE

BACKGROUND

Congestion marking (e.g., explicit congestion notification (ECN) marking and weighted random early detection (WRED) marking) of packets requires proportionally fair virtual output queue (VOQ) scheduling by a scheduler at an egress of a network device.

SUMMARY

In some implementations, a method may include receiving a plurality of packets, and calculating, during a time interval, an arrival rate and a departure rate, of the plurality of packets, at one of a plurality of virtual output queues of the network device. The method may include calculating a current oversubscription factor based on the arrival rate and the departure rate, and calculating a target oversubscription factor based on an average of previous oversubscription factors associated with the plurality of virtual output queues. The method may include determining whether a difference exists between the target oversubscription factor and the current oversubscription factor, and calculating, when the difference exists between the target oversubscription factor and the current oversubscription factor, a scale factor based on the current oversubscription factor and the target oversubscription factor. The method may include calculating new scheduling weights for the plurality of virtual output queues based on prior scheduling weights for the plurality of virtual output queues and the scale factor, and processing packets received by the plurality of virtual output queues based on the new scheduling weights.

In some implementations, a network device includes one or more memories and one or more processors to receive a plurality of packets, and calculate, during a time interval, an arrival rate and a departure rate, of the plurality of packets, at one of a plurality of virtual output queues of the network device. The one or more processors may calculate a current oversubscription factor based on the arrival rate and the departure rate and may calculate a target oversubscription factor based on an average of previous oversubscription factors associated with the plurality of virtual output queues. The one or more processors may determine whether a difference exists between the target oversubscription factor and the current oversubscription factor, and may maintain prior scheduling weights for the plurality of virtual output queues when the difference does not exist between the target oversubscription factor and the current oversubscription factor. The one or more processors may calculate, when the difference exists between the target oversubscription factor and the current oversubscription factor, a scale factor based on the current oversubscription factor and the target oversubscription factor, and may calculate new scheduling weights for the plurality of virtual output queues based on the prior scheduling weights and the scale factor. The one or more processors may perform one or more actions based on the new scheduling weights.

In some implementations, a non-transitory computer-readable medium may store a set of instructions that includes one or more instructions that, when executed by one or more processors of a network device, cause the network device to, receive a plurality of packets, and calculate, during a time interval, an arrival rate and a departure rate, of the plurality of packets, at one of a plurality of virtual output queues of the network device. The one or more instructions may cause the network device to cause the network device to calculate a current oversubscription factor based on the arrival rate and the departure rate, and calculate a target oversubscription factor based on an average of previous oversubscription factors associated with the plurality of virtual output queues. The one or more instructions may cause the network device to determine whether a difference exists between the target oversubscription factor and the current oversubscription factor, and calculate, when the difference exists between the target oversubscription factor and the current oversubscription factor, a scale factor based on the current oversubscription factor and the target oversubscription factor. The one or more instructions may cause the network device to calculate new scheduling weights for the plurality of virtual output queues based on prior scheduling weights for the plurality of virtual output queues and the scale factor, and normalize the new scheduling weights to smallest integer values and to generate normalized new scheduling weights. The one or more instructions may cause the network device to perform one or more actions based on the normalized new scheduling weights.

BRIEF DESCRIPTION OF THE DRAWINGS

FIG. 5 is a flowchart of an example process for determining rate differential weighted fair output queue scheduling for a network device.

DETAILED DESCRIPTION

Figure 1A:
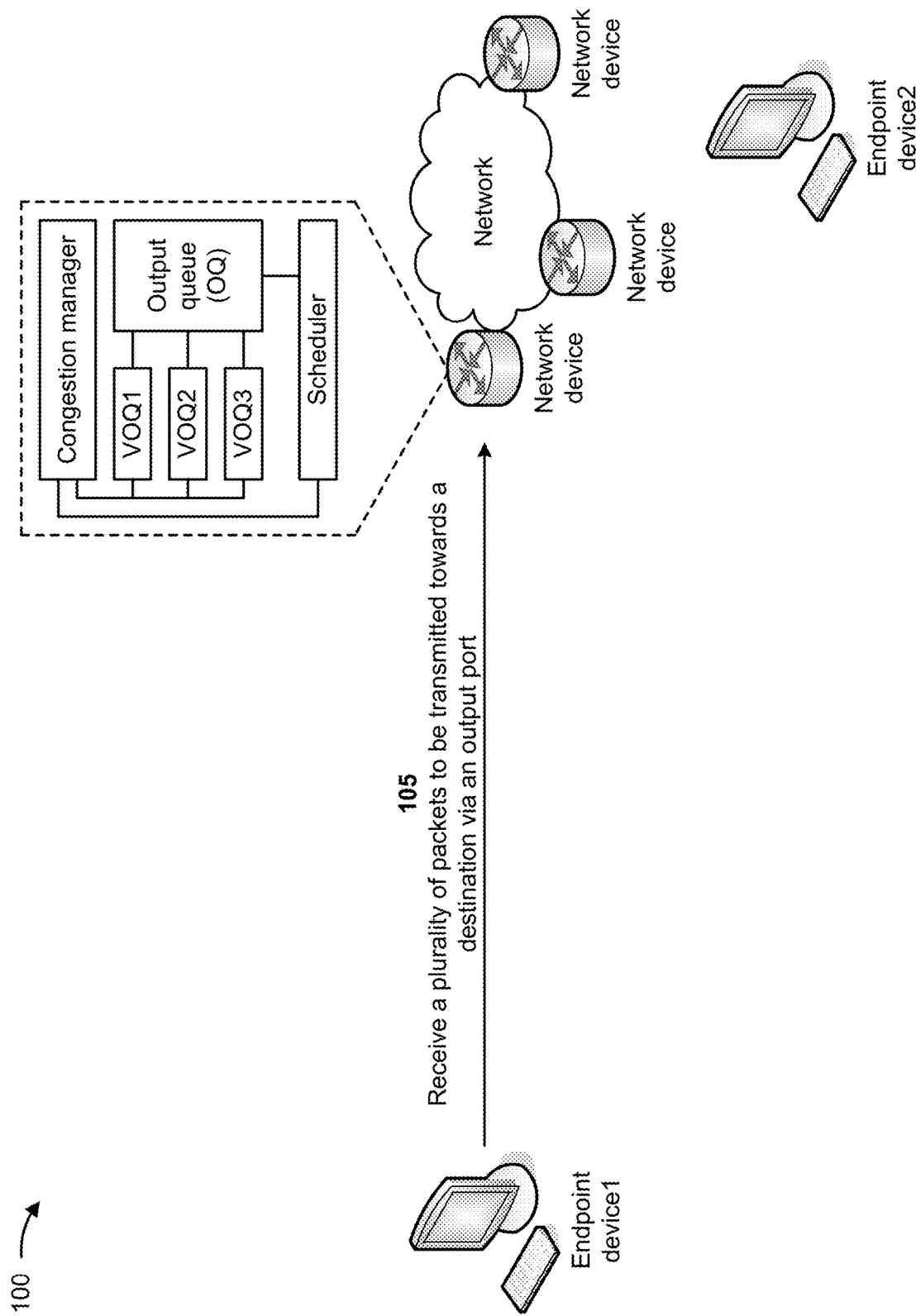
FIGS. 1A-1E are diagrams of an example implementation described herein.

The following detailed description of example implementations refers to the accompanying drawings. The same reference numbers in different drawings may identify the same or similar elements.

Conventional VOQ scheduling techniques use a simple round robin to read each of the VOQs associated with an output queue. However, the speed of the ports of a network device and the arrival rate of traffic on each port can vary greatly. Because the VOQs are often shared by one or more ports, differing speeds of the ports and/or differing arrival rates of traffic on each port may cause simple round robin scheduling techniques to be ineffective for providing proportionally fair VOQ scheduling by a scheduler at an egress of the network device. Further, a departure rate of each VOQ can also vary greatly due to scheduling variations, which occur as the VOQs are processed by a scheduler, thereby further inhibiting proportionally fair VOQ scheduling by the scheduler.

Congestion at each VOQ sharing an output queue requires a same level of congestion or oversubscription. Conventional VOQ scheduling does not guarantee source bandwidth or congestion fairness since a demand placed on each VOQ is unknown. When the bandwidth seen at each VOQ varies greatly across the network device, some VOQs will drop traffic and other VOQs will not drop traffic, creating unfairness. Performance of the network device may be impacted for applications relying on congestion fairness. Thus, current VOQ scheduling techniques waste computing resources (e.g., processing resources, memory resources, communication resources, and/or the like), network resources, and/or the like associated with negatively impacting applications relying on congestion fairness, dropping traffic, handling customer complaints associated with the impacted applications and/or the dropped traffic, and/or the like.

Some implementations described herein relate to a network device that determines rate differential weighted fair output queue scheduling for a network device. For example, the network device may receive a plurality of packets and may calculate, during a time interval, an arrival rate and a departure rate, of the plurality of packets, at one of a plurality of virtual output queues of the network device. The network device may calculate a current oversubscription factor based on the arrival rate and the departure rate, and may calculate a target oversubscription factor based on an average of previous oversubscription factors associated with the plurality of virtual output queues. The network device may determine whether a difference exists between the target oversubscription factor and the current oversubscription factor. The network device may calculate, when the difference exists between the target oversubscription factor and the current oversubscription factor, a scale factor based on the current oversubscription factor and the target oversubscription factor. The network device may calculate new scheduling weights for the plurality of virtual output queues based on prior scheduling weights for the plurality of virtual output queues and the scale factor, and may process packets received by the plurality of virtual output queues based on the new scheduling weights.

In this way, the network device determines rate differential weighted fair output queue scheduling for the network device. The network device may achieve bandwidth fair VOQ scheduling where a level of oversubscription (e.g., congestion) is measured at each VOQ and then used to adjust scheduler weights so that each VOQ achieves a same level of oversubscription. The network device may determine a current oversubscription of a VOQ based on a relationship between a packet arrival rate and a packet departure rate. When the current oversubscription is different from a previously computed target oversubscription, the network device may adjust (e.g., increase or decrease) a scheduling weight for the VOQ. This, in turn, conserves computing resources, networking resources, and/or the like that otherwise would be wasted in association with negatively impacted applications of a network device, dropping packets, handling customer complaints associated with the impacted applications and/or the dropped packets, and/or the like.

FIGS. 1A-1E are diagrams of an example 100 associated with determining rate differential weighted fair output queue scheduling for a network device. As shown in FIGS. 1A-1E, example 100 includes endpoint devices associated with a network that includes multiple network devices. Each of the endpoint devices may include a wireless communication device, a mobile phone, a user equipment, a laptop computer, a tablet computer, a desktop computer, and/or the like, as described herein. Each of the network devices may include a router, a gateway, a switch, a firewall, a hub, a bridge, a reverse proxy, and/or the like. Although FIGS. 1A-1E describe a network device receiving data packets from and transmitting data packets toward a single endpoint device, in some implementations, the network device may receive data packets from and/or transmit data packets toward multiple endpoint devices in a similar manner.

The network device may include a plurality of input ports configured to receive data packets and a plurality of output ports configured to transmit data packets from the network device and towards a destination. An output port may be associated with one or more output queues configured to store data packets to be transmitted from the network device via the output port. The output queue may be associated with a plurality of VOQs. A data packet that is received via an input port and is to be transmitted towards a destination via the output port may be stored in a VOQ, of the plurality of VOQs associated with the output queue. Each VOQ, of the plurality of VOQs, may be associated with one or more input ports of the plurality of input ports of the network device.

A congestion manager of the network device may monitor an arrival rate corresponding to a rate at which data packets are stored in each VOQ, of the plurality of VOQs associated with the output queue, and a departure rate corresponding to a rate at which data packets are transmitted from each VOQ to the output queue. The congestion manager may determine an oversubscription associated with each VOQ and provide information identifying the oversubscriptions to a scheduler of the network device, as described in greater detail below. The scheduler may utilize a rate differential weighted fair VOQ scheduling process to schedule the transmission of data packets from the plurality of VOQs and to the output queue. The rate differential weighted fair VOQ scheduling process may utilize a set of weights that are determined based on the oversubscriptions, as described in greater detail below.

As shown in FIG. 1A, and by reference number 105, the network device receives a plurality of data packets to be transmitted towards a destination (e.g., endpoint device 2, as shown in FIG. 1A) via an output port. The network device may store the plurality of data packets in a plurality of VOQs (e.g., VOQ1, VOQ2, and VOQ3, as shown in FIG. 1A) associated with an output queue (e.g., output queue OQ, as shown in FIG. 1A) associated with the output port.

Figure 1B:
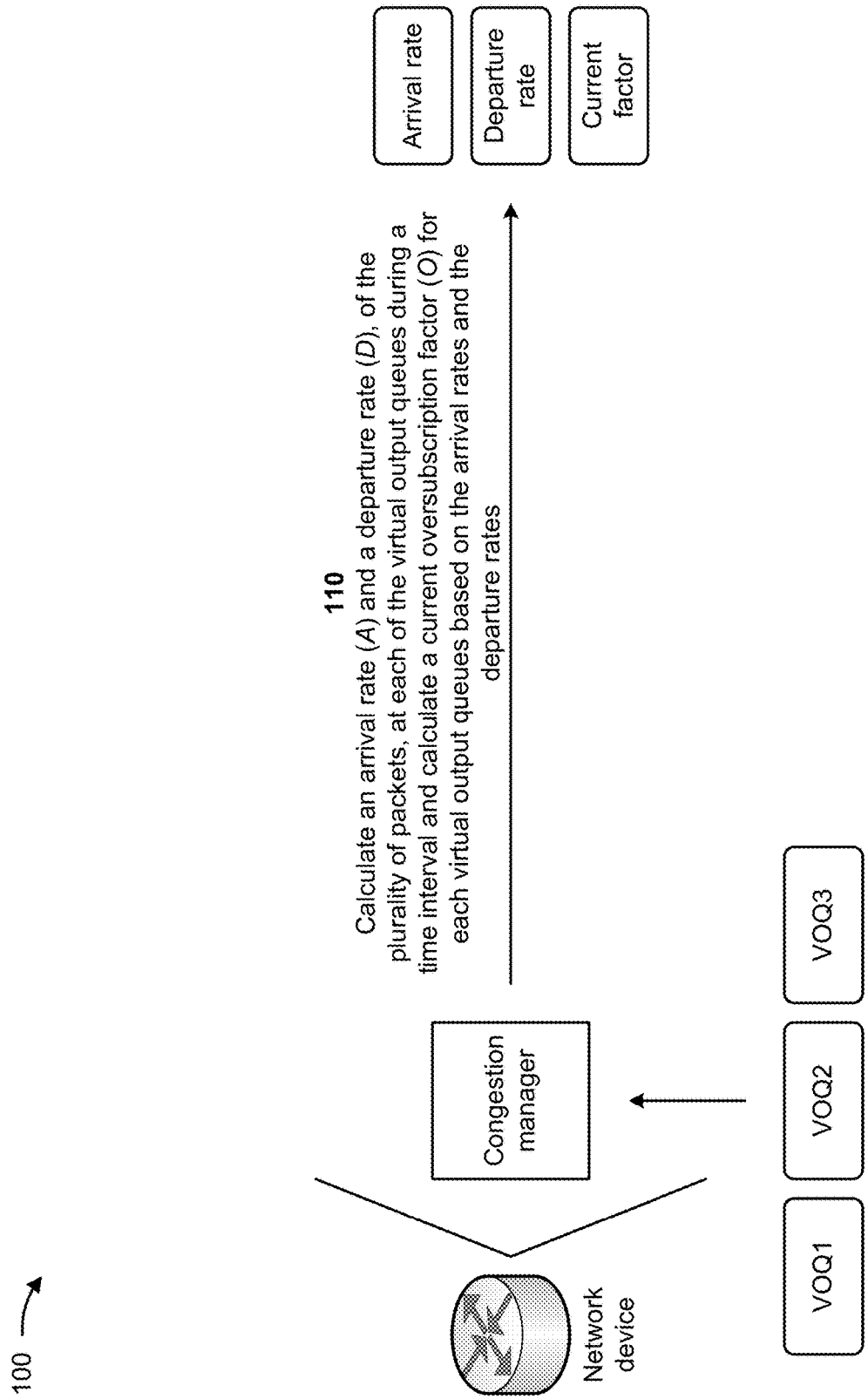

As shown in FIG. 1B, and by reference number 110, the congestion manager calculates an arrival rate (A) and a departure rate (D), of the plurality of data packets, at each of the VOQs during a time interval, and calculates a current oversubscription factor (O) for each of the VOQs based on the arrival rates and the departure rates. The arrival rate for a VOQ may be calculated based on a quantity of data packets stored in the VOQ during the time interval. For example, the congestion manager may calculate the arrival rate for the VOQ based on dividing the quantity of data packets stored in the VOQ by the time interval.

The departure rate for a VOQ may be determined based on a quantity of data packets that are removed from the VOQ (e.g., transmitted to the output queue associated with the VOQ) during the time interval. For example, the congestion manager may calculate the departure rate for the VOQ based on dividing the quantity of data packets removed from the VOQ by the time interval.

The congestion manager may select the time interval based on a microburst of data packets received by the network device and/or based on dynamic adaptation to changing oversubscription for the VOQs. In some implementations, the VOQs are isochronous and utilize the same time interval. For example, the congestion manager may calculate the arrival rate and the departure rate for each of the VOQs every 9 µs, every 18 µs, every 36 µs, and/or the like. In some implementations, one or more of the VOQs may utilize a different time interval that is different from a time interval utilized by one or more other VOQs. For example, the congestion manager may calculate the arrival rate and the departure rate for a first VOQ, of the VOQs, every 9 µs and may calculate the arrival rate and the departure rate for a second VOQ, of the VOQs, every 18 µs.

In some implementations, the current oversubscription factor for a VOQ is calculated based on a ratio of the arrival rate and the departure rate for the VOQ. For example, the oversubscription factor for a VOQ may be calculated based on dividing the arrival rate for the VOQ by the departure rate for the VOQ. In some implementations, the congestion manager calculates the oversubscription factors for each of the VOQs based on an expiration of the time interval.

The congestion manager may provide the oversubscription factors determined for the VOQs to the scheduler. The congestion manager may provide the oversubscription factors periodically (e.g., based on the expiration of the time interval), based on calculating one or more of the oversubscription factors, and/or the like.

Figure 1C:
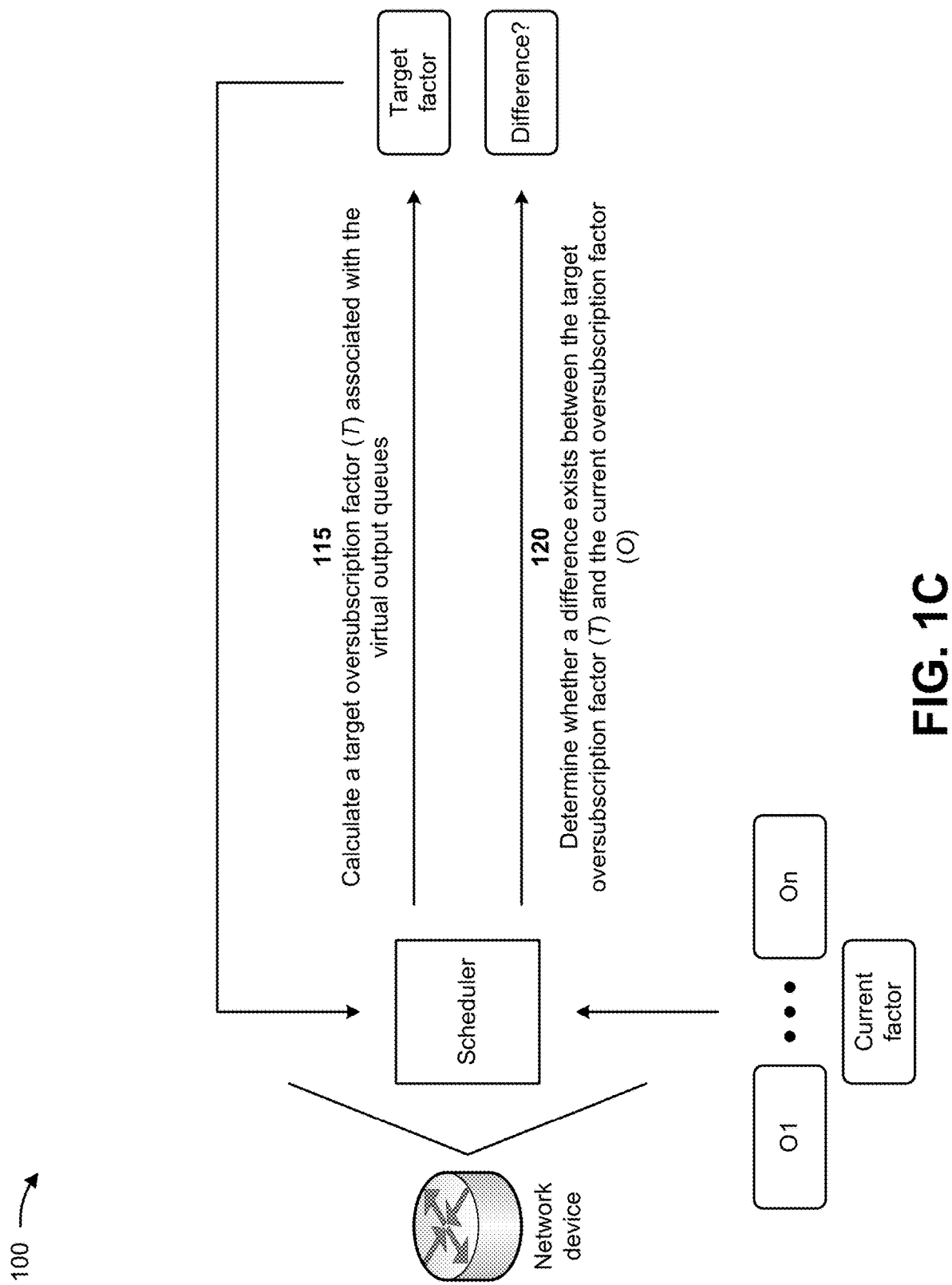

As shown in FIG. 1C, and by reference number 115, the scheduler of the network device calculates a target oversubscription factor T associated with the VOQs. In some implementations, the scheduler initially (e.g., a first time the target oversubscription factor is calculated by the scheduler) calculates the target oversubscription factor based on a default value (e.g., 1.0). The default value may correspond to a state in which the target oversubscription factor for each of the VOQs is the same. Subsequently, the scheduler may calculate the target oversubscription factor based on an average of previous oversubscription factors associated with the VOQs. For example, the scheduler may calculate the target oversubscription factor based on dividing a sum of the previous oversubscription factors by a quantity of VOQs.

As shown by reference number 120, the scheduler determines whether a difference exists between the target oversubscription factor T and the current oversubscription factor O calculated for each of the VOQs. The scheduler may compare the target oversubscription factor and the current oversubscription factor calculated for each VOQ to determine whether a difference exists between the target oversubscription factor and the current oversubscription factors. In some implementations, for each of the VOQs, a difference does not exist between the target oversubscription factor and the current oversubscription factor (e.g., the target oversubscription factor and the current oversubscription factor calculated for each of the VOQs are all the same value). In these implementations, the scheduler maintains the prior scheduling weights based on the difference not existing between the target oversubscription factor and the current oversubscription factors. For example, the scheduler may continue to utilize current weights associated with the VOQs and utilized by the rate differential weighted fair VOQ scheduling process.

Figure 1D:
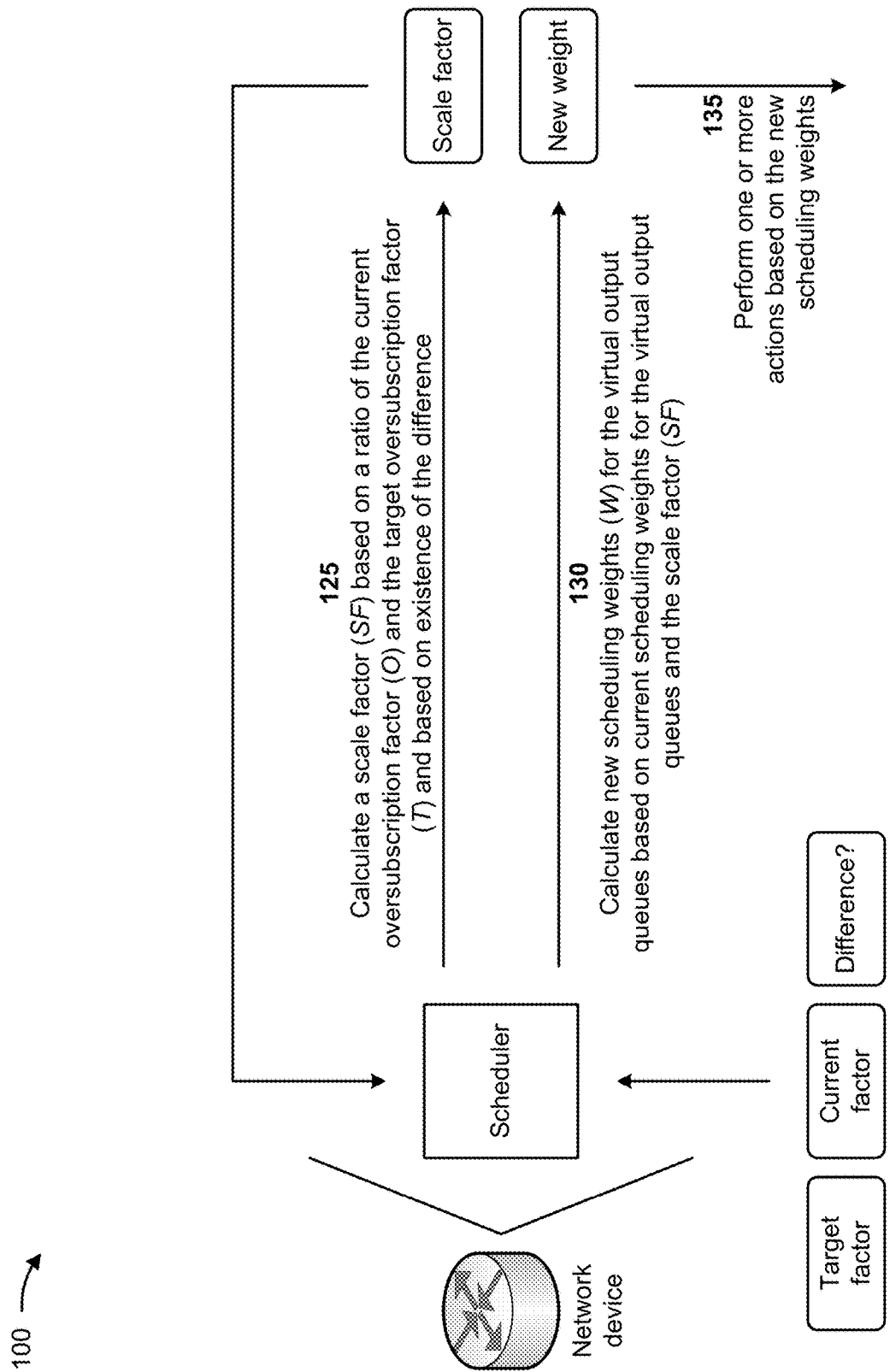

In some implementations, a difference does exist between the target oversubscription factor and the current oversubscription factor calculated for at least one of the VOQs. As shown in FIG. 1D, and by reference number 125, the scheduler calculates a scale factor SF based on a ratio of the current oversubscription factor O and the target oversubscription factor T calculated for the VOQ and based on the existence of the difference. The schedule may calculate a scale factor for each VOQ based on the target oversubscription factor and the current oversubscription factor calculated for each VOQ. For example, the scheduler may calculate the scale factor for a first VOQ, of the VOQs, based on dividing the current oversubscription factor calculated for the first VOQ by the target oversubscription factor. In some implementations, the scheduler normalizes the scale factor to a smallest integer value. The scheduler may calculate the scale factors for the other VOQs, of the VOQs, in a similar manner.

In some implementations, when one of the new scheduling weights is greater than a corresponding one of the current scheduling weights, the new scheduling weight may cause congestion to be reduced in a VOQ associated with the new scheduling weight based on application of the one of the new scheduling weights to processing packets received by the VOQ during the next time interval. When one of the new scheduling weights is less than a corresponding one of the current scheduling weights, the new scheduling weight may cause congestion to increase in a corresponding VOQ, based on application of the new scheduling weight to processing packets received by the corresponding VOQ during the next time interval.

As shown by reference number 130, the scheduler calculates new scheduling weights W for the VOQs based on current scheduling weights for the VOQs and the scale factor SF. The scheduler may obtain the current scheduling weights utilized in the rate differential weighted fair VOQ scheduling process based on accessing a data structure (e.g., a database, a table, a list, and/or the like) stored in a memory associated with the network device. Each current scheduling weight, of the current scheduling weights, may be associated with a respective VOQ of the VOQs. The scheduler may calculate a new scheduling weight for a VOQ, of the VOQs, based on multiplying the current scheduling weight associated with the VOQ by the scale factor calculated for the VOQ. The scheduler may calculate new scheduling weights for each of the other VOQs in a similar manner.

As shown by reference number 135, the network device performs one or more actions based on the new scheduling weights W. In some implementations, the one or more actions include the scheduler applying the new scheduling weights to processing data packets received by the VOQs during a next time interval. The scheduler may calculate a new target oversubscription factor based on applying the new scheduling weights to processing packets received by the VOQs during the next time interval. In some implementations, the scheduler may calculate the new target oversubscription factor in a manner similar to that described above.

Figure 1E:
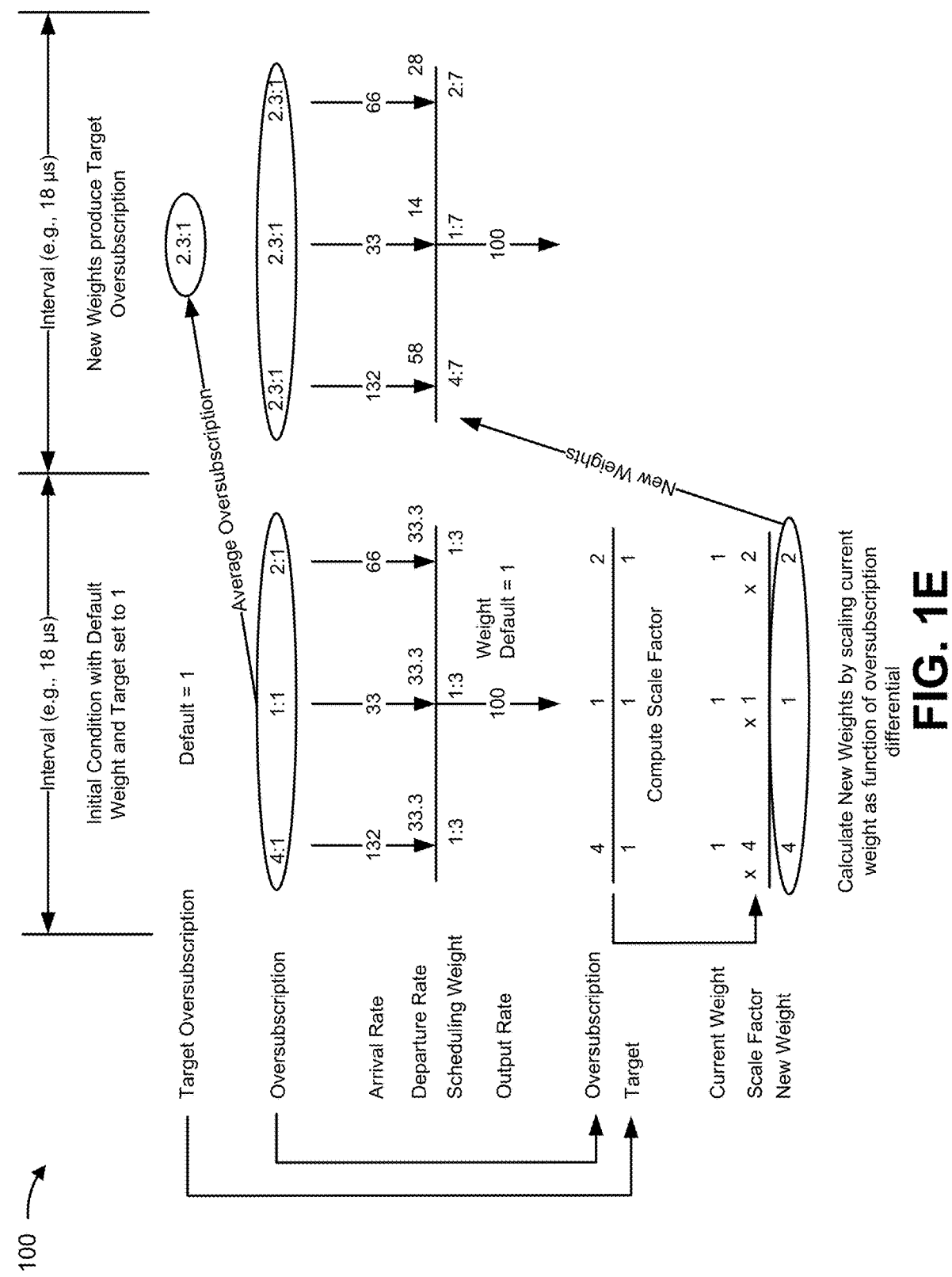

FIG. 1E is a diagram illustrating an example process associated with rate differential weighted fair VOQ scheduling. Assume that an output queue is associated with three VOQs, that the target oversubscription factor is initially set to 1 (e.g., a target oversubscription factor associated with the arrival rate being equal to the departure rate), and that the scheduling weights for the three VOQs are set to a default weight of 1 (e.g., a scheduling weight associated with removing data packets from the VOQs at the same rate).

During an initial time interval, the congestion manager may determine arrival rates (e.g., 132, 33, and 66, as shown in FIG. 1E) and departure rates (e.g., 33.3, 33.3, and 33.3) for the VOQs, in a manner similar to that described above. The departure rates for the VOQs may be the same for the initial time interval based on the scheduling weights being set to the default weight.

The congestion manager may determine a current oversubscription factor (e.g., 4, 1, and 2, as shown in FIG. 1E) for each of the VOQs. For example, the congestion manager may determine the current oversubscription factor for each of the VOQs based on an expiration of the first time interval, in a manner similar to that described above. The congestion manager may provide the current oversubscription factors determined for the VOQs to the scheduler.

The scheduler may receive the current oversubscription factors and may determine that at least one of the current oversubscription factors is different from the target oversubscription factor. The scheduler may calculate scaling factors for the VOQs (e.g., 4, 1, 2, as shown in FIG. 1E) based on at least one of the current oversubscription factors being different from the target oversubscription factor. In some implementations, the scheduler calculates the scaling factors in a manner similar to that described above.

The scheduler may calculate new scheduling weights (e.g., 4, 1, and 2, as shown in FIG. 1E) for the VOQs based on the scaling factors. In some implementations, the scheduler calculates the new scheduling weights in a manner similar to that described above. The scheduler may apply the new weights to processing packets received by the VOQs, in a manner similar to that described above. The scheduler may calculate a new target oversubscription factor (e.g., 2.3, as shown in FIG. 1E) based on the current oversubscription factors. For example, the scheduler may calculate the new oversubscription factor based on calculating an average of the current oversubscription factors in a manner similar to that described above. The process may repeat for a next time interval based on the new scheduling weights and the new target oversubscription factor in a manner similar to that described above.

In this way, the network device determines rate differential weighted fair output queue scheduling for a network device. The network device may achieve bandwidth fair VOQ scheduling where a level of oversubscription (e.g., congestion) is measured at each VOQ and then used to adjust scheduler weights so that each VOQ achieves a same level of oversubscription. The network device may determine a current oversubscription of a VOQ based on a relationship between a packet arrival rate and a packet departure rate. When the current oversubscription is different from a previously computed target oversubscription, the network device may adjust (e.g., increase or decrease) a scheduling weight for the VOQ. This, in turn, conserves computing resources, networking resources, and/or the like that would otherwise have been wasted in impacting applications of a network device, dropping packets, handling customer complaints associated with the impacted applications and/or the dropped packets, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
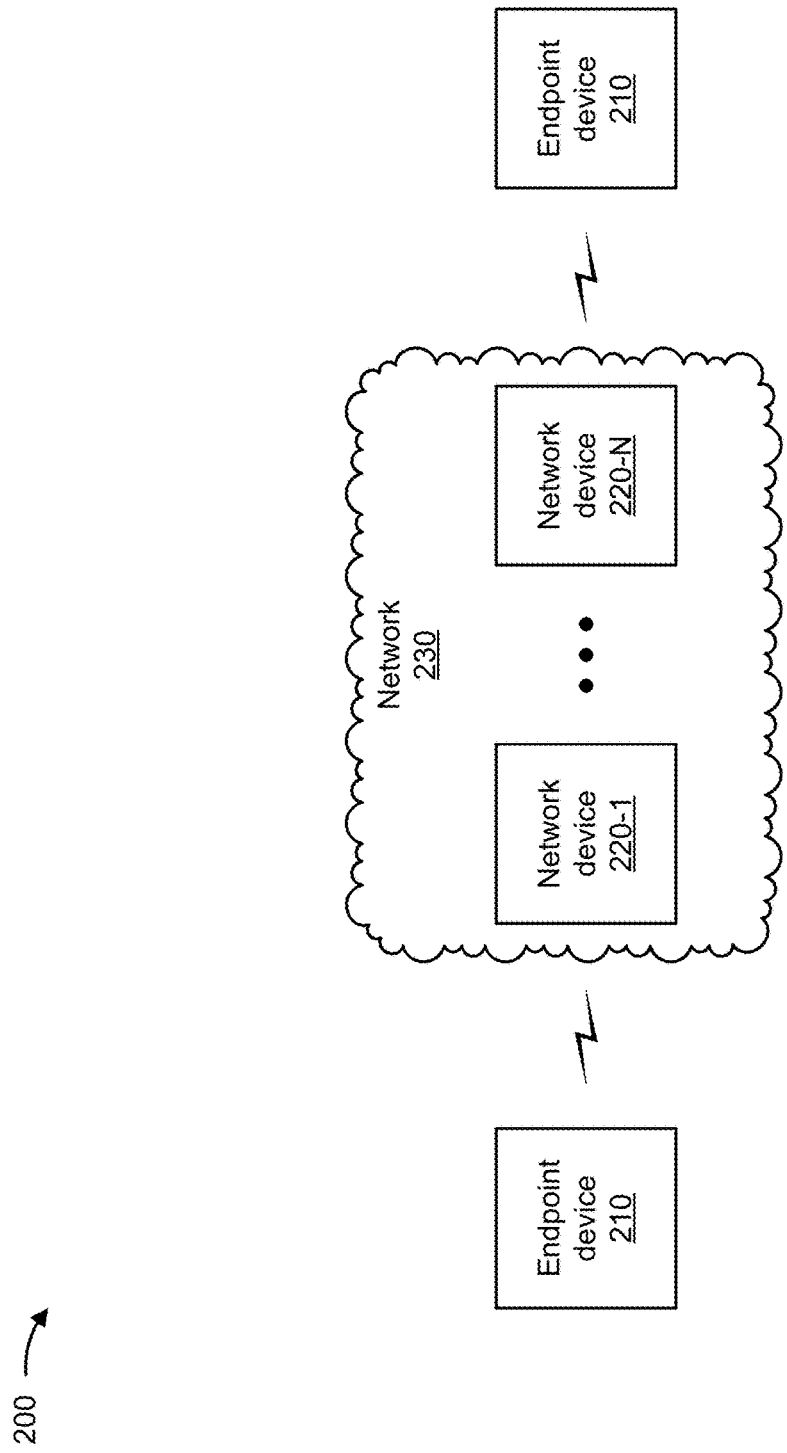
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
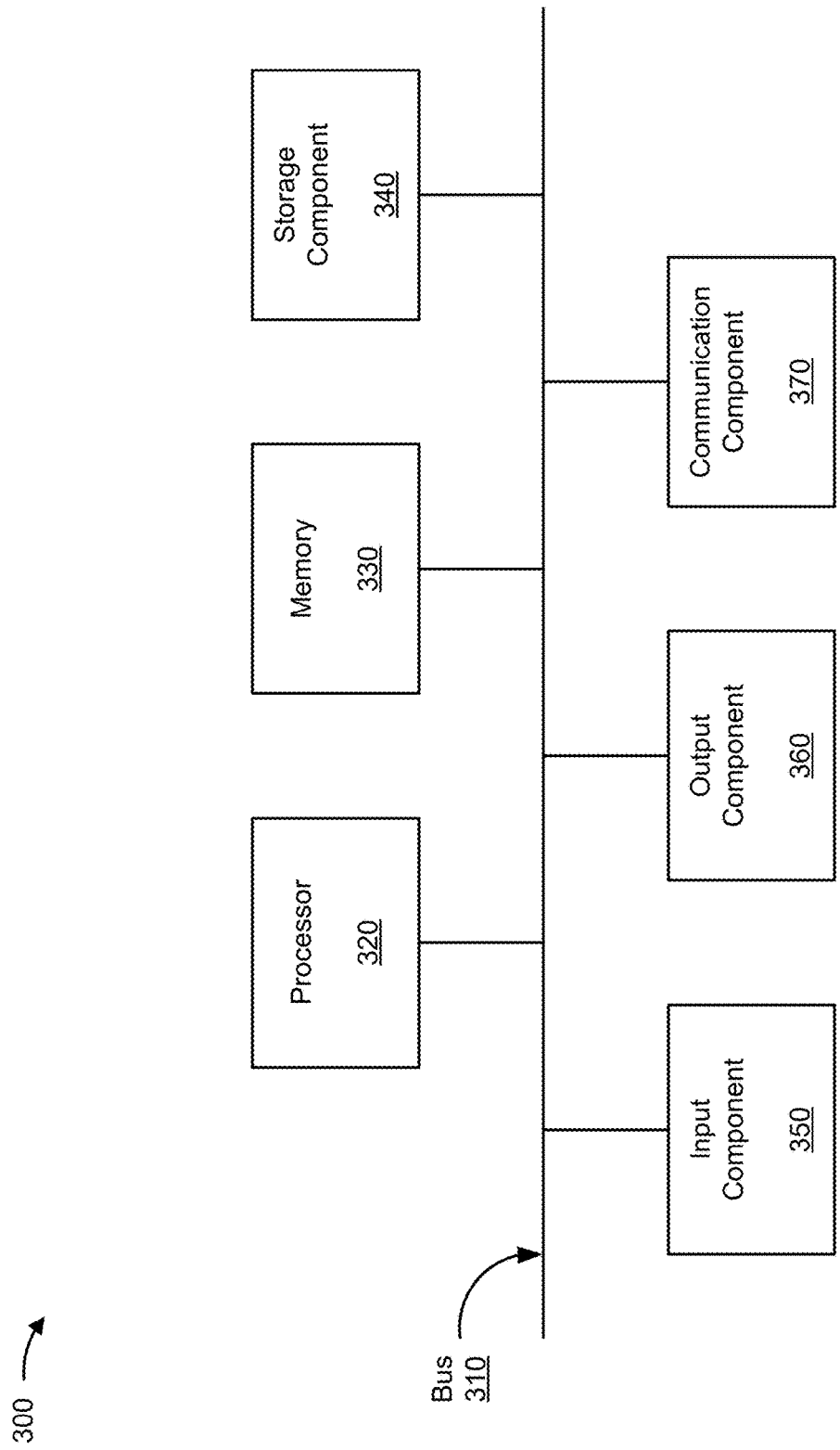
FIGS. 3 and 4 are diagrams of example components of one or more devices of FIG. 2.

FIG. 3 is a diagram of example components of a device 300, which may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
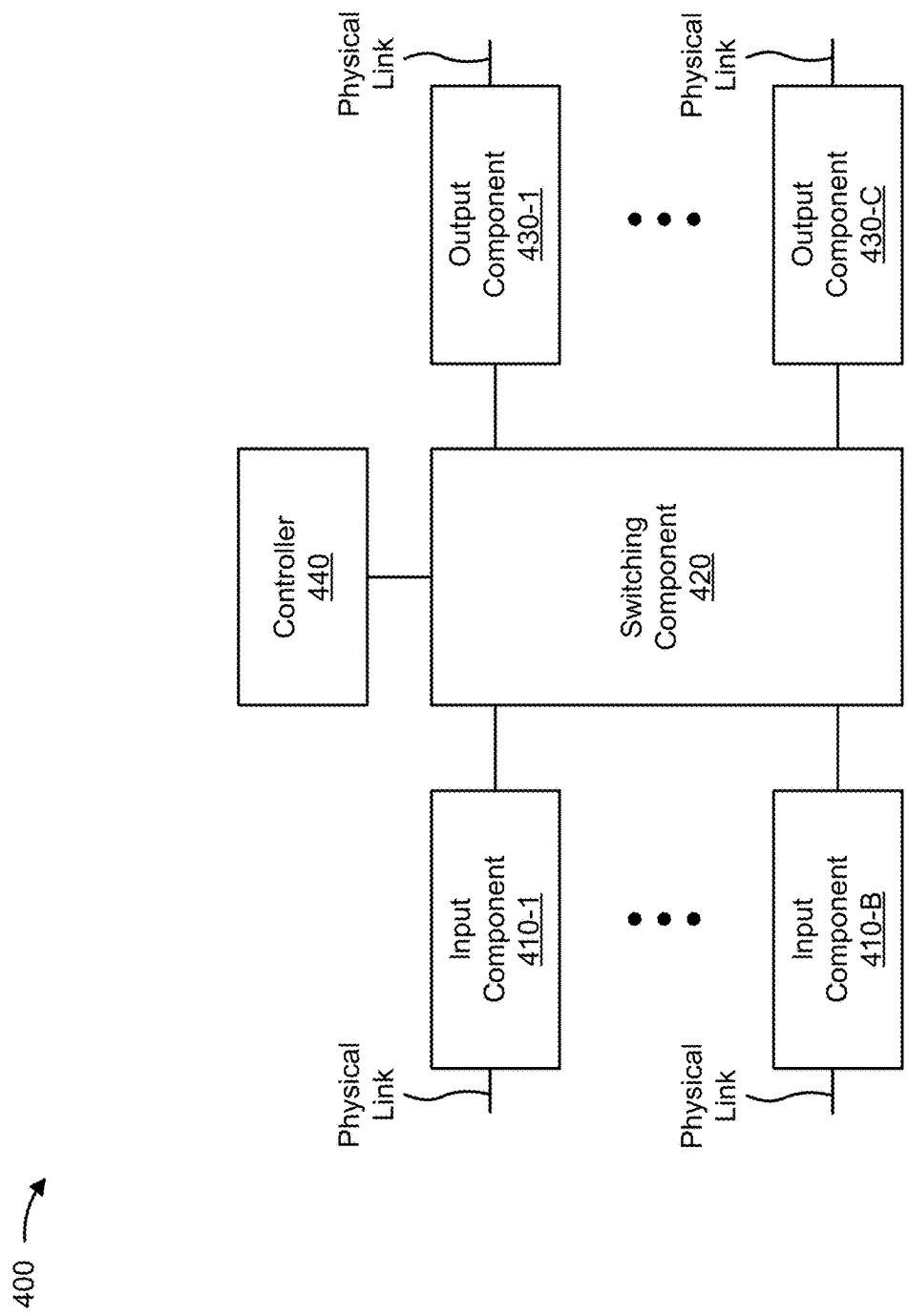

FIG. 4 is a diagram of example components of a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for determining rate differential weighted fair output queue scheduling for a network device. In some implementations, one or more process blocks of FIG. 5 may be performed by a network device (e.g., network device 220). In some implementations, one or more process blocks of FIG. 5 may be performed by another device or a group of devices separate from or including the device, such as an endpoint device (e.g., endpoint device 210). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving a plurality of packets (block 510). For example, the network device may receive a plurality of packets, as described above.

As further shown in FIG. 5, process 500 may include calculating, during a time interval, an arrival rate and a departure rate, of the plurality of packets, at one of a plurality of VOQs of the network device (block 520). For example, the network device may calculate, during a time interval, an arrival rate and a departure rate, of the plurality of packets, at one of a plurality of VOQs of the network device, as described above. In some implementations, the plurality of VOQs is associated with an output queue of the network device, and each of the plurality of VOQs is associated with one or more ports of the network device. In some implementations, the plurality of VOQs may be isochronous and may utilize the same time interval.

To calculate the arrival rate and the departure rate at the one of the plurality of VOQs, the network device may determine a first quantity of packets arriving at the one of the plurality of VOQs. The network device may divide the first quantity of packets by the time interval to calculate the arrival rate. The network device may determine a second quantity of packets departing at the one of the plurality of VOQs. The network device may divide the second quantity of packets by the time interval to calculate the departure rate.

As further shown in FIG. 5, process 500 may include calculating a current oversubscription factor based on the arrival rate and the departure rate (block 530). For example, the network device may calculate a current oversubscription factor based on the arrival rate and the departure rate, as described above. In some implementations, the network device may calculate the current oversubscription factor based on dividing the arrival rate by the departure rate.

As further shown in FIG. 5, process 500 may include calculating a target oversubscription factor based on an average of previous oversubscription factors associated with the plurality of virtual output queues (block 540). For example, the network device may calculate a target oversubscription factor based on an average of previous oversubscription factors associated with the plurality of virtual output queues, as described above. In some implementations, the network device may calculate the target oversubscription factor based on dividing a sum of the previous oversubscription factors by a quantity of the plurality of VOQs.

As further shown in FIG. 5, process 500 may include determining whether a difference exists between the target oversubscription factor and the current oversubscription factor (block 550). For example, the network device may determine whether a difference exists between the target oversubscription factor and the current oversubscription factor, as described above. In some implementations, the network device may maintain the prior scheduling weights when the difference does not exist between the target oversubscription factor and the current oversubscription factor.

As further shown in FIG. 5, process 500 may include calculating, when the difference exists between the target oversubscription factor and the current oversubscription factor, a scale factor based on the current oversubscription factor and the target oversubscription factor (block 560). For example, the network device may calculate, when the difference exists between the target oversubscription factor and the current oversubscription factor, a scale factor based on the current oversubscription factor and the target oversubscription factor, as described above. In some implementations, the network device may calculate the scale factor based on dividing the current oversubscription factor by the target oversubscription factor.

As further shown in FIG. 5, process 500 may include calculating new scheduling weights for the plurality of virtual output queues based on prior scheduling weights for the plurality of VOQs and the scale factor (block 570). For example, the network device may calculate new scheduling weights for the plurality of VOQs based on prior scheduling weights for the plurality of virtual output queues and the scale factor, as described above. In some implementations, the network device may normalize the new scheduling weights to smallest integer values.

As further shown in FIG. 5, process 500 may include processing, by the network device, packets received by the plurality of VOQs based on the new scheduling weights (block 580). For example, the network device may process packets received by the plurality of VOQs based on the new scheduling weights, as described above. In some implementations, the network device may apply the new scheduling weights to processing packets received by the plurality of VOQs during a next time interval. The network device may select the time interval based on a microburst of packets received by the network device and based on dynamic adaptation to changing oversubscription for the plurality of VOQs. The network device may calculate a new target oversubscription factor based on applying the new scheduling weights to processing packets received by the plurality of VOQs during a next time interval.

In some implementations, when one of the new scheduling weights is greater than a corresponding one of the prior scheduling weights, the network device may reduce congestion of a corresponding one of the plurality of VOQs based on application of the one of the new scheduling weights to processing packets received by the corresponding one of the plurality of VOQ during a next time interval. When one of the new scheduling weights is less than a corresponding one of the prior scheduling weights, the network device may increase congestion of a corresponding one of the plurality of VOQ based on application of the one of the new scheduling weights to processing packets received by the corresponding one of the plurality of VOQs during a next time interval.

In some implementations, the network device may apply the normalized new scheduling weights to processing packets received by the plurality of VOQs during a next time interval. The network device may calculate a new target oversubscription factor based on applying the normalized new scheduling weights to processing the packets received by the plurality of virtual output queues during the next time interval.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a plurality of packets;
   calculating, by the network device and during a time interval, an arrival rate and a departure rate, of the plurality of packets, at one of a plurality of virtual output queues of the network device,
      wherein the network device includes a plurality of output ports,
         wherein an output port, of the plurality of output ports, is associated with the plurality of virtual output queues;
   calculating, by the network device, a current oversubscription factor based on the arrival rate and the departure rate;
   calculating, by the network device, a target oversubscription factor based on an average of previous oversubscription factors associated with the plurality of virtual output queues,
      wherein calculating the target oversubscription factor comprises:
         calculating the target oversubscription factor based on dividing a sum of the previous oversubscription factors by a quantity of the plurality of virtual output queues;
   determining, by the network device, whether a difference exists between the target oversubscription factor and the current oversubscription factor;
   calculating, by the network device and when the difference exists between the target oversubscription factor and the current oversubscription factor, a scale factor based on the current oversubscription factor and the target oversubscription factor;
   calculating, by the network device, new scheduling weights for the plurality of virtual output queues based on prior scheduling weights for the plurality of virtual output queues and the scale factor; and
   processing, by the network device, packets received by the plurality of virtual output queues based on the new scheduling weights.

2. The method of claim 1, wherein calculating the scale factor based on the current oversubscription factor and the target oversubscription factor comprises:
   calculating the scale factor based on dividing the current oversubscription factor by the target oversubscription factor.

3. The method of claim 1, further comprising:
maintaining the prior scheduling weights when the difference does not exist between the target oversubscription factor and the current oversubscription factor.

4. The method of claim 1, wherein processing the packets received by the plurality of virtual output queues comprises:
applying the new scheduling weights to processing the packets received by the plurality of virtual output queues during a next time interval.

5. The method of claim 1, wherein processing the packets received by the plurality of virtual output queues comprises:
calculating a new target oversubscription factor based on applying the new scheduling weights to processing packets received by the plurality of virtual output queues during a next time interval.

6. The method of claim 1, wherein the plurality of virtual output queues is isochronous and utilizes the same time interval.

7. The method of claim 1, further comprising:
selecting the time interval based on a microburst of packets received by the network device and based on dynamic adaptation to changing oversubscription for the plurality of virtual output queues.

8. A network device, comprising:
one or more memories; and
one or more processors to:
receive a plurality of packets;
calculate, during a time interval, an arrival rate and a departure rate, of the plurality of packets, at one of a plurality of virtual output queues of the network device,
wherein the network device includes a plurality of output ports,
wherein an output port, of the plurality of output ports, is associated with the plurality of virtual output queues;
calculate a current oversubscription factor based on the arrival rate and the departure rate;
calculate a target oversubscription factor based on an average of previous oversubscription factors associated with the plurality of virtual output queues,
wherein the one or more processors, when calculating the target oversubscription factor, are to:
calculate the target oversubscription factor based on dividing a sum of the previous oversubscription factors by a quantity of the plurality of virtual output queues;
determine whether a difference exists between the target oversubscription factor and the current oversubscription factor;
maintain prior scheduling weights for the plurality of virtual output queues when the difference does not exist between the target oversubscription factor and the current oversubscription factor;
calculate, when the difference exists between the target oversubscription factor and the current oversubscription factor, a scale factor based on the current oversubscription factor and the target oversubscription factor;
calculate new scheduling weights for the plurality of virtual output queues based on the prior scheduling weights and the scale factor; and
perform one or more actions based on the new scheduling weights.

9. The network device of claim 8, wherein the one or more processors are further to:
select the time interval based on a microburst of packets received by the network device and based on dynamic adaptation to changing oversubscription for the plurality of virtual output queues.

10. The network device of claim 8, wherein:
the plurality of virtual output queues is associated with an output queue of the network device.

11. The network device of claim 8, wherein the one or more processors, when calculating the arrival rate and the departure rate at the one of the plurality of virtual output queues, are to:
determine a first quantity of packets arriving at the one of the plurality of virtual output queues;
divide the first quantity of packets by the time interval to calculate the arrival rate;
determine a second quantity of packets departing at the one of the plurality of virtual output queues; and
divide the second quantity of packets by the time interval to calculate the departure rate.

12. The network device of claim 8, wherein, when one of the new scheduling weights is greater than a corresponding one of the prior scheduling weights and when performing the one or more actions, the one or more processors are to:
reduce congestion of a corresponding one of the plurality of virtual output queues based on application of the one of the new scheduling weights to processing packets received by the corresponding one of the plurality of virtual output queues during a next time interval.

13. The network device of claim 8, wherein, when one of the new scheduling weights is less than a corresponding one of the prior scheduling weights and when performing the one or more actions, the one or more processors are to:
increase congestion of a corresponding one of the plurality of virtual output queues based on application of the one of the new scheduling weights to processing packets received by the corresponding one of the plurality of virtual output queues during a next time interval.

14. The network device of claim 8, wherein the one or more processors are further to:
normalize the new scheduling weights to smallest integer values prior to performing the one or more actions based on the new scheduling weights.

15. A non-transitory computer-readable medium storing a set of instructions, the set of instructions comprising:
one or more instructions that, when executed by one or more processors of a network device, cause the network device to:
receive a plurality of packets;
calculate, during a time interval, an arrival rate and a departure rate, of the plurality of packets, at one of a plurality of virtual output queues of the network device,
wherein the network device includes a plurality of output ports,
wherein an output port, of the plurality of output ports, is associated with the plurality of virtual output queues;
calculate a current oversubscription factor based on the arrival rate and the departure rate;
calculate a target oversubscription factor based on an average of previous oversubscription factors associated with the plurality of virtual output queues,
wherein the one or more instructions, that cause the network device to calculate the target oversubscription factor, cause the network device to:

calculate the target oversubscription factor based on dividing a sum of the previous oversubscription factors by a quantity of the plurality of virtual output queues;

determine whether a difference exists between the target oversubscription factor and the current oversubscription factor;

calculate, when the difference exists between the target oversubscription factor and the current oversubscription factor, a scale factor based on the current oversubscription factor and the target oversubscription factor;

calculate new scheduling weights for the plurality of virtual output queues based on prior scheduling weights for the plurality of virtual output queues and the scale factor;

normalize the new scheduling weights to smallest integer values and to generate normalized new scheduling weights; and perform one or more actions based on the normalized new scheduling weights.

16. The non-transitory computer-readable medium of claim 15, wherein the one or more instructions, that cause the network device to calculate the scale factor based on the current oversubscription factor and the target oversubscription factor, cause the network device to:

calculate the scale factor based dividing the current oversubscription factor by the target oversubscription factor.

17. The non-transitory computer-readable medium of claim 15, wherein the one or more instructions, that cause the network device to perform the one or more actions, cause the network device to:

apply the normalized new scheduling weights to processing packets received by the plurality of virtual output queues during a next time interval; and calculate a new target oversubscription factor based on applying the normalized new scheduling weights to processing the packets received by the plurality of virtual output queues during the next time interval.

18. The non-transitory computer-readable medium of claim 15, wherein the one or more instructions, when executed by the network device, further cause the network device to:

select the time interval based on a microburst of packets received by the network device and based on dynamic adaptation to changing oversubscription for the plurality of virtual output queues.

19. The non-transitory computer-readable medium of claim 15, wherein the one or more instructions, that cause the network device to calculate the arrival rate and the departure rate, at the one of the plurality of virtual output queues, cause the network device to:

determine a first quantity of packets arriving at the one of the plurality of virtual output queues;

divide the first quantity of packets by the time interval to calculate the arrival rate;

determine a second quantity of packets departing at the one of the plurality of virtual output queues; and divide the second quantity of packets by the time interval to calculate the departure rate.

20. The non-transitory computer-readable medium of claim 15, wherein the one or more instructions, that cause the network device to calculate the new scheduling weights for the plurality of virtual output queues, cause the network device to:

multiply the prior scheduling weight by the scale factor.

\* \* \* \* \*